US011644154B2

(12) United States Patent
Takezawa

(10) Patent No.: US 11,644,154 B2
(45) Date of Patent: May 9, 2023

(54) SAFELY JOINT

(71) Applicant: TATSUNO CORPORATION, Tokyo (JP)

(72) Inventor: Masahiro Takezawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 21 days.

(21) Appl. No.: 17/563,604

(22) Filed: Dec. 28, 2021

(65) Prior Publication Data

US 2022/0221111 A1    Jul. 14, 2022

(30) Foreign Application Priority Data

Jan. 14, 2021   (JP) .............................. JP2021-003872

(51) Int. Cl.
*F17C 13/04* (2006.01)
*F17C 5/00* (2006.01)

(52) U.S. Cl.
CPC ............... *F17C 13/04* (2013.01); *F17C 5/00* (2013.01); *F17C 2205/0332* (2013.01); *F17C 2221/012* (2013.01); *F17C 2260/04* (2013.01); *F17C 2265/065* (2013.01); *F17C 2270/0184* (2013.01)

(58) Field of Classification Search
CPC ............ F16L 37/28; F16L 37/38; F16L 29/02
USPC ....................... 137/614.04; 141/346
See application file for complete search history.

(56) References Cited

U.S. PATENT DOCUMENTS

2019/0017616 A1*  1/2019  Takezawa .............. B60K 15/04

FOREIGN PATENT DOCUMENTS

| EP | 3333469 A1 | 6/2018 |
| EP | 3428502 A1 | 1/2019 |
| JP | 2006097874 A | 4/2006 |
| JP | 2007120717 A | 5/2007 |

OTHER PUBLICATIONS

Extended European Search Report for Application No. EP 22 15 0985; dated Apr. 26, 2022.

* cited by examiner

*Primary Examiner* — Timothy P. Kelly
*Assistant Examiner* — Christopher M Afful
(74) *Attorney, Agent, or Firm* — Stetina Brunda Garred & Brucker

(57) ABSTRACT

To provide a safety joint that can immediately shut off a hydrogen gas flow path at the initial stage when a plug (nozzle side member) comes out of a socket (fueling apparatus side member) to prevent release of outgas. A safety joint (100, 100-1) of the present invention includes: a plug (10) with a flow path (1A) formed inside, a shutoff valve (5) of the plug (10) opens when connected to a socket (20); and the socket (20), a flow path (21A) in communication with the flow path (1A) is formed when connected to the plug (10); and when the plug (10) is disconnected from the socket (20), the flow paths (1A, 21A) of the plug (10) and the socket (20) are shut off, wherein the socket has an opening (21C) that communicates with the flow path (21A) and extends orthogonally to the flow path (21A); when the plug and the socket are connected, a protruding portion (3) of the plug is inserted into the opening; and a socket flow path blocking mechanism (30, 31) is provided to instantly close the flow path (21A) at an initial stage when the plug is disconnected from the socket.

4 Claims, 12 Drawing Sheets

SAFELY JOINT

CROSS-REFERENCE TO RELATED APPLICATIONS

The present application claims priority to JP2021-003872 filed on Jan. 14, 2021, the disclosure of which is incorporated herein by reference.

STATEMENT RE: FEDERALLY SPONSORED RESEARCH/DEVELOPMENT

Not Applicable

BACKGROUND

1. Technical Field

The present invention relates to a filling apparatus for filling gas such as hydrogen gas used as fuel. More particularly, the present invention relates to a pipe joint for separating the filling apparatus and a gas filling nozzle from each other in an emergency while a gas is filled with the filling apparatus.

2. Description of the Related Art

As show in FIG. 11, a filling nozzle 202 attached to an end of a filling hose 201 of a hydrogen filling apparatus 200 installed at a hydrogen filling station and a vehicle side filling port 203 of a vehicle A (for example, a fuel cell vehicle: FCV) are connected with each other to fill hydrogen gas to the vehicle A. This filling of hydrogen gas is performed while being controlled depending on the maximum working pressure of a hydrogen tank 204 mounted to the vehicle A. Here, when the vehicle A runs to pull the filling hose 201 while hydrogen gas is filled, the hydrogen filling apparatus 200, the filling nozzle 202, the filling hose 201, or other equipment is broken to inject a hydrogen gas. Then, a pipe joint 300 for emergency releasing is mounted between the hydrogen filling apparatus 200 and the filling hose 201, and when a tensile force equal to or higher than a predetermined value is applied, the pipe joint 300 for emergency releasing is divided to prevent the hydrogen filling apparatus 200, the filling nozzle 202, the filling hose 201, or other equipment arts from being broken.

As a prior art, the present applicant proposed a pipe joint for emergency releasing including: a cylindrical plug (filling nozzle side member) in which a flow path is formed; a cylindrical socket (filling apparatus side member) in which a flow path is formed; and when the plug is inserted into the socket, shutoff valves open the flow paths of the plug and the socket to communicate the flow paths with each other, and when the plug is disconnected from the socket, the shutoff valves close. In the pipe joint for emergency releasing, central axes of the flow paths of the plug and the socket do not form the same straight line; when the plug is inserted into the socket, an end of a socket side valve stem (an end, opposing the end of the socket side valve stem, of a valve element) contacts with a plug side rod accommodating case and a valve element mounted to the other side of the socket side valve stem is held at a position separated from a socket side valve seat against an elastic repulsive force of an elastic body on the socket side, and a locking member held in the plug side rod accommodating case is restricted to move radially outward by an inner wall at a socket body side opening, and a plug side valve stem contacts with the locking member and does not move toward the socket side, and a valve body provided on the plug side valve stem is held at a position separated from a plug side valve seat against an elastic repulsive force of an elastic body on the plug side (refer to Patent Document 1). This pipe joint (disclosed in the Patent Document 1) is very useful.

However, in the pipe joint 100 of the prior art (described in the Patent Document 1), when a large tensile force acts on the filling hose 201 (shown in FIG. 11), at an initial stage of the process that the plug 10 is pulled out from the socket 22 (the stage at which the plug 10 starts to come out), as shown in FIG. 12, the socket side rod 22 connected to the valve body 25 on the socket 20 side is placed on the plug side valve stem 2 or a cover member 3 of the valve stem. Under the condition (the state shown in FIG. 12), the socket side valve body 25 positions separately from the socket side valve seat 21E against the elastic repulsive force of a spring 23 on the socket 20 side, which causes the socket side shutoff valve 24 to be held in an open state. For that reason, at the initial stage where the plug 10 is ejected from the socket 20 (the stage where the plug 10 is beginning to be ejected), a high-pressure hydrogen gas supplied from the filling apparatus 200 (FIG. 14) through the opening portion 21C on the socket 20 side flows out to the outside of the pipe joint 300 as a so-called "outgas". In FIG. 12, the outflow of the outgases is indicated by the arrows OG.

Prior Art document Japan Patent No. 6540967 gazette

BRIEF SUMMARY

The present invention has been made in consideration of the above problems in the prior art, and the object thereof is to provide a safety joint that can immediately shut off a hydrogen gas flow path at the initial stage when a plug, which is a nozzle side member, comes out of a socket, which is a filling apparatus side member, to prevent release of outgas.

A safety joint (100, 100-1) of the present invention includes: a cylindrical nozzle side member (10: plug) with a flow path (1A: in-plug flow path) formed inside, a shutoff valve (5: plug side shutoff valve) of the nozzle side member (10) opens when the nozzle side member (10) is connected to a filling apparatus side member (20: socket); and the filling apparatus side member (20) with a cylindrical shape, a flow path (21A: socket side flow path) in communication with the flow path (1A: in-plug flow path) of the nozzle side member (10) is formed when the filling apparatus side member (20) is connected to the nozzle side member (10); and when the nozzle side member (10) is disconnected from the filling apparatus side member (20), the flow paths (1A, 21A) of the nozzle side member (10) and the filling apparatus side member (20) are shut off, wherein the safety joint (for emergency releasing) (100, 100-1) is characterized in that the filling apparatus side member (20) has an opening (21C) that communicates with the flow path (21A: socket side flow path) of the filling apparatus side member (20) and extends orthogonally to the flow path (21A) of the filling apparatus side member (20); when the nozzle side member (10) and the filling apparatus side member (20) are connected, a protruding portion (3) of the nozzle side member (10) is inserted into the opening (21C) on the filling apparatus side; and a filling apparatus side member flow path blocking mechanism (30, 31) is provided to instantly close the flow path (21A) of the filling apparatus side member (20) at an initial stage when the nozzle side member (10) is disconnected from the filling apparatus side member (20).

In the present invention, it is preferable that the filling apparatus side member flow path blocking mechanism (30) includes a valve body (25: socket side valve body) provided in the flow path (21A) of the filling apparatus side member (20), an elastic member (23: socket side spring) on the filling device side that urges the valve body (25), and a support member (26: valve body support member) for supporting (mounting) a valve body (25) of the filling apparatus side member (20), wherein the support member (26) is placed (supported) on a rotational shape member (11) when the nozzle side member (10) and the filling apparatus side member (20) are connected, and moves to a state in which the support member (26) does not support the valve body (25) on the filling device side at the initial stage (the nozzle side member 10 starts moving) when the nozzle side member (10) is disconnected from the filling apparatus side member (20).

In the safety joint, it is preferable that the rotational shape member (11) is provided with a folded-back portion (11R), after the support member (26) moves to a state in which the support member (26) does not support (mount) the valve body (25) on the filling device side (20) at the initial stage when the nozzle side member (10) is disconnected from the filling apparatus side member (20), the folded-back portion (11R) of the rotational shape member (11) moves to a position surrounding the support member (26).

Further, in the present invention, it is preferable that the filling apparatus side member flow path blocking mechanism (31) includes a plug member (27) slidably inserted into the opening (21C) of the filling apparatus side member (20); the plug member (27) is connected to the protruding portion (3) of the nozzle side member (10); sealing materials (S1, S2) are arranged at the opening (21C) of the filling apparatus side member (20) to prevent a high pressure gas from leaking from boundaries between an outer peripheral surfaces of the protruding portion (3) of the nozzle side member (10) as well as the plug member (27) and an inner peripheral surface of the opening (21C).

The safety joint preferably further includes a mechanism for disconnecting the plug member (27) from the protruding portion (3) of the nozzle side member (10) when the nozzle side member (10) is disconnected from the filling apparatus side member (20), wherein the mechanism includes: a groove (3D) formed in the protruding portion (3) of the nozzle side member (10); an opening portion (27A) formed on the plug member (27); balls (28) fitted in the groove (3D) formed in the protruding portion (3) and the opening portion (27A) formed on the plug member (27); an enlarged diameter portion (21H) at the opening portion (21C) of the filling apparatus side member (20); a flange portion (27B) at an end of the plug member (27); and an end face (29A) of a stopper member (29) provided on the filling apparatus side member (20).

According to the safety joint (100) of the present invention with the above-mentioned configuration, when the nozzle side member (10) and the filling device side member (20) are connected, the support member (26: valve body support member) is placed (supported) on the rotational shape member (11), and at the initial stage when (10) the nozzle side member (10) is disconnected from the filling device side member (20), the support member (26) moves so as not to support the valve body (25) on the filling device side as the nozzle side member (10) moves. With this, the support member (26) moves to the state it does not support (mount) the valve body (25) in conjunction with the nozzle side member (10) at the initial stage when the nozzle side member (10) is disconnected from the filling device side member (20). When the valve body (25) is no longer supported by the support member (26), the support member (26) does not block the movement of the valve body (25), so that the elastic member (23) on the filling device side causes the valve body (25) on the filling device side to be pressed and sit on the valve seat (21E: socket side valve seat). Consequently, at the initial stage when the nozzle side member (10) is disconnected from the filling device side member (20), the shutoff valve (24) on the filling device side shuts off, and the generation of outgas is suppressed. Further, in the safety joint (100-1) of the present invention, the plug member (27) slidably inserted into the opening (21C) of the filling device side member (20) is provided, and the plug member (27) is connected to the nozzle protruding portion (3) of the side member (10), the sealing materials (S1, S2) are arranged in the opening (21C) of the filling device side member (20), the sealing materials (S1, S2) having a function to prevent a high pressure gas from leaking from the boundaries between the outer peripheral surfaces of the protruding portion (3) as well as the plug member (27) and the inner peripheral surface of the opening (21C). With this when the nozzle side member (10) comes off from the filling device side member (20), the protruding portion (3) or the plug member (27) of the nozzle side member (10) closes the flow path (21A) on the filling device side. Then, since the sealing materials (S1, S2) seal the boundaries between the outer peripheral surfaces of the protruding portion (3) as well as the plug member (27) and the inner peripheral surface of the opening (21C), a high-pressure air in the flow path (21A) of the filling device side member (20) is prevented from leaking from the opening (21C).

Here, when the nozzle side member (10) is disconnected from the filling device side member (20), due to hydrogen gas accumulating in the annular space (21F), if there is a part freely movable without being bonded to other members/parts (so-called "free state"), in accordance with coming off of the nozzle side member (10), the part freely movable will be pressed to the opposite side of the nozzle side member (10) from coming off, which may cause the part to interfere with the nozzle side member (10) or the filling device side member (20) (so-called "biting" state). Alternatively, the freely movable part also comes off from the filling device side member (20) and gets mixed in with any of the hydrogen filling stations and is lost. In this way, parts that have been bitten by other members or lost parts cannot be reused. Accordingly, every time the nozzle side member (10) comes off from the filling device side member (20), a new product must be used, which increases the cost for preparing a new product.

On the other hand, in the safety joint (100) of the present invention, the rotational shape member (11) is provided with the folded-back portion (11R), thereby after the nozzle side member (10) is initially disconnected from the filling device side member (20), and the support member (26: valve body support member) changes to a state in which the valve body (25) of the filling device side member (20) is not supported (not mounted), if the folded-back portion (11A) of the rotational shape member (11) moves to a position where the folded-back portion (11A) surrounds the support member (26), the support member (26) surrounded by the folded-back portion (11R) of the rotational shape member (11) does not interfere with other parts and is not lost. With this, the support member (26) and other parts can be reused. Further, in the safety joint (100-1) of the present invention, if a mechanism for disconnecting the plug member (27) from the protruding portion (3) of the nozzle side member (10) when the nozzle side member (10) comes off from the filling device side member (20) is provided, even if the nozzle-side member (10) is disconnected from the filling device side member (20), the plug member (27) does not fall off from the opening (21C) of the filling device side member (20), and no member will be lost. In addition, when the nozzle side member (10) is disconnected from the filling device side member (20), other than the nozzle side member (10), the plug member (27) only slides in the opening (21C) of the filling device side member (20), and no other part does not interfere with the nozzle side member (10) or the plug member (27) (there is no so-called "biting"). Even if the nozzle side member (10) is disconnected from the filling device side member (20), all the parts can be reused accordingly.

DETAILED DESCRIPTION

Figure 12:
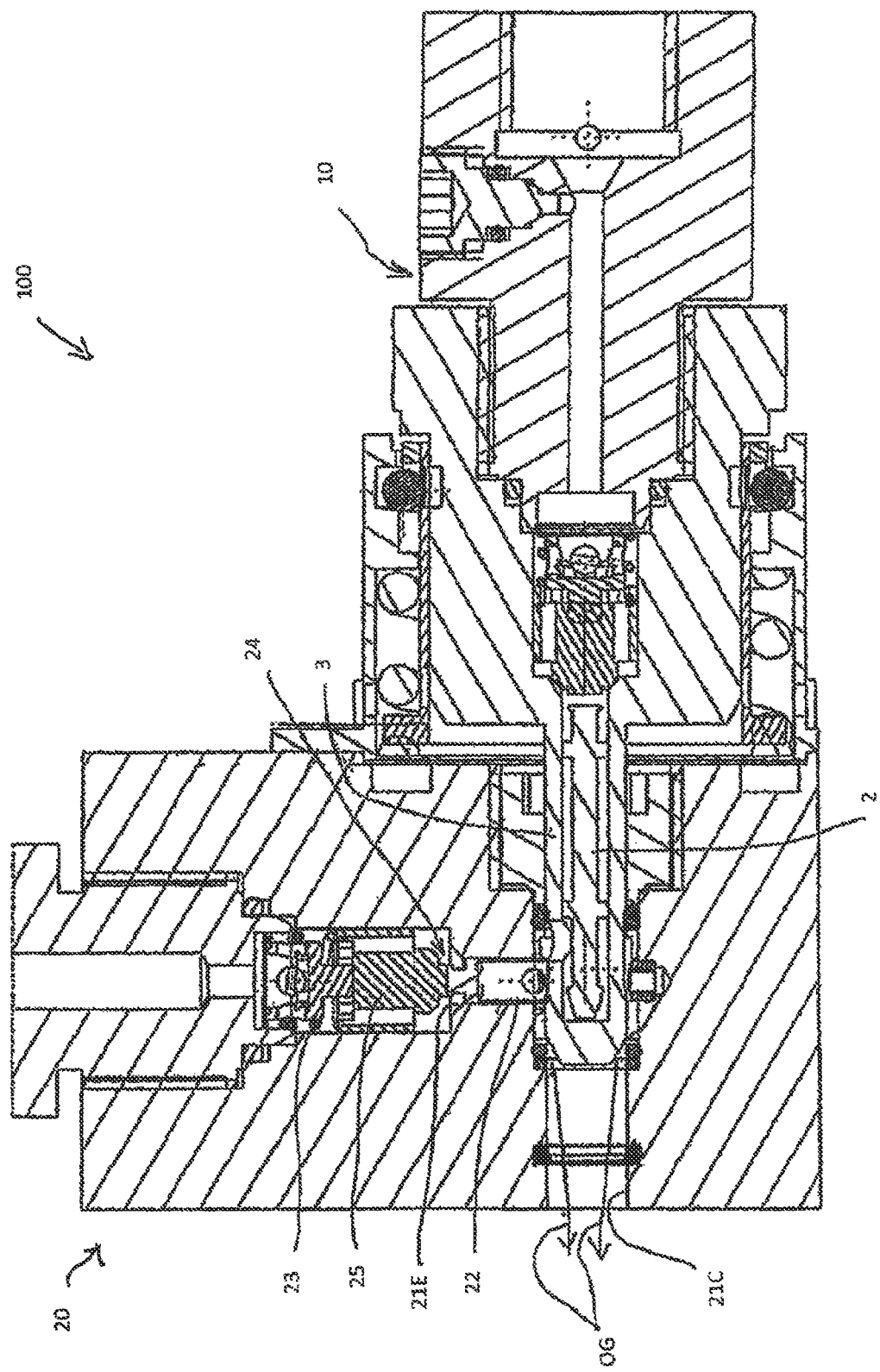
FIG. 12 is a cross-sectional view showing an initial stage of the process that a plug is pulled out from a socket in a prior art.

Hereinafter, embodiments of the present invention will be explained with reference to the attached drawings. In the illustrated embodiments, the same members as those shown in FIG. 12 are designated by the same reference numerals. In the illustrated embodiments, the safety joint entirely represented by the reference numeral 100 according to the first embodiment and the safety joint represented by the reference numeral 100-1 according to the second embodiment each have a socket 20 as a filling apparatus side member and a plug 10 as a nozzle side member, and are configured such that the plug 10 shuts off an in-socket flow path 21A at the initial stage when the plug 10 comes out of the socket 20.

Figure 1:
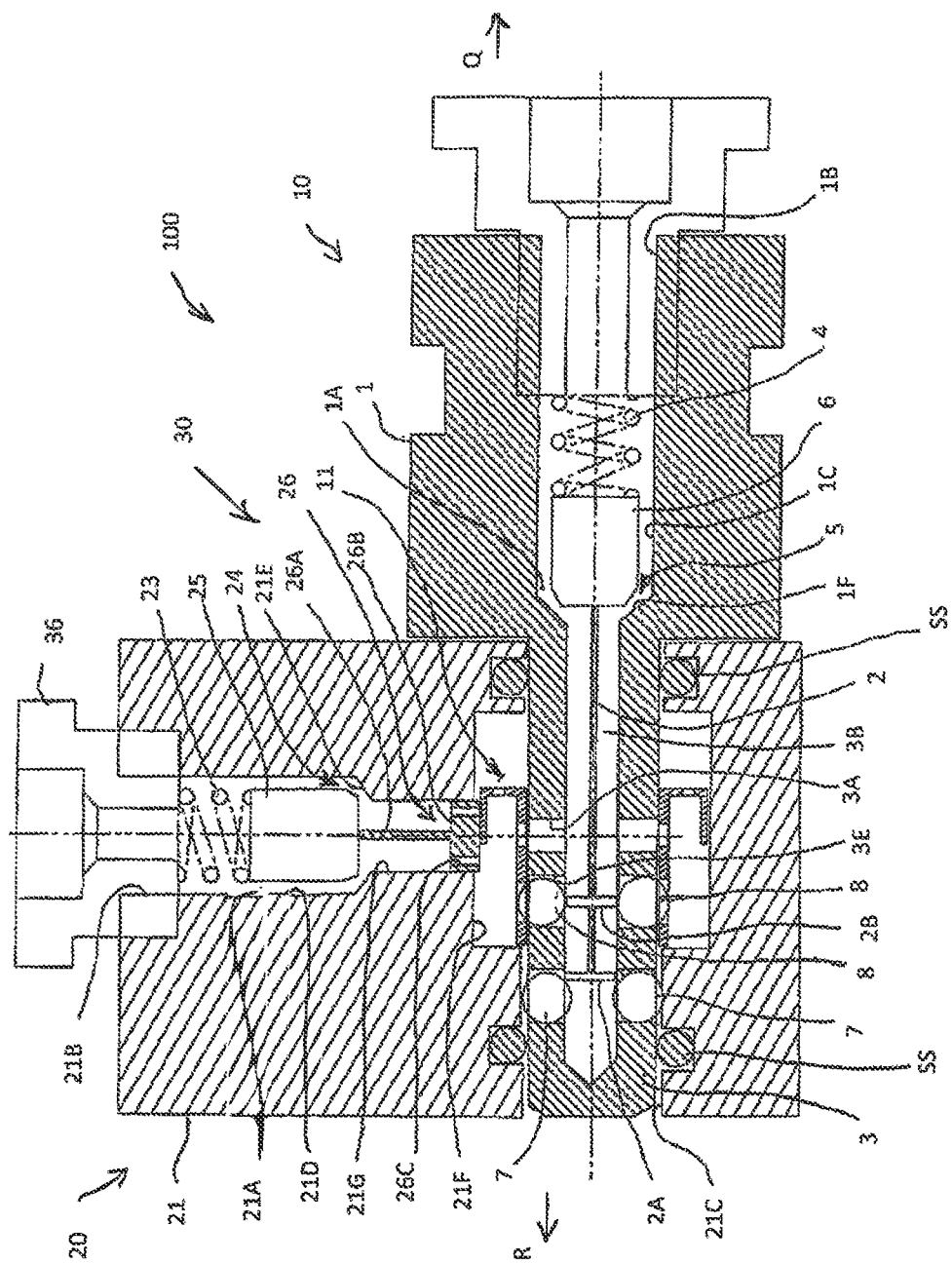
FIG. 1 is an explanatory cross-sectional view of a safety joint according to the first embodiment of the present invention in a state where a plug is connected to a socket.

First, the safety joint 100 according to the first embodiment will be explained with reference to FIGS. 1 to 6. In FIG. 1 showing a state in which the plug 10 (nozzle side member) and the socket 20 (filling apparatus side member) are connected in the first embodiment, the plug 10 having a cylindrical shape as a whole has a plug body 1 and a plug side protruding member 3 protruding toward the socket 20 side. As shown in FIG. 1, in a state where the plug 10 and the socket 20 are connected, the plug side protruding member 3 is inserted into an opening 21C formed in the socket body 21. At the center of a vehicle side (right side in FIG. 1, side separated from socket 20 side) end of the plug body 1 (the central portion in the vertical direction at the right end of the plug body 1 in FIG. 1), a hydrogen gas supply port 1B connected to a filling hose (not shown) is provided.

An in-plug flow path 1A is formed at the center of the plug side protruding member 3 in the radial direction, and the in-plug flow path 1A extends in the axial direction (left-right direction in FIG. 1) of the plug 10. A plug side valve body accommodating portion 1C is provided in the in-plug flow path 1A, and the plug side valve body accommodating portion 1C is an expanded area in the in-plug flow path 1A. The in-plug flow path 1A extends from the flow path in the plug side protruding member 3 (internal space 3B of the plug side protruding member 3) to the hydrogen gas supply port 1B via the flow path in the plug side valve body accommodating portion 1C. In other words, the in-plug flow path 1A includes the internal space 3B of the plug side protruding member 3 and the flow path in the plug side valve body accommodating portion 1C. Further, a hole 3A is formed in the plug side protruding member 3. The in-plug flow path 1A communicates with the in-socket flow path 21A, which will be described later, through the hole 3A, the hole 11B of the rotational shape member 11 (see FIG. 2), the annular space 21F in the opening 21C of the socket body 21, and the hole 26C of the support member 26 (valve support member). Here, the annular space 21F is an enlarged diameter portion of the opening 21C.

The plug side rod 2 is housed in the in-plug flow path 1A. A plug side valve body 6 is provided at the tip of the plug side rod 2 on the side separated from the socket 20 (on the right side in FIG. 1). The plug side valve body 6 is housed in the valve body accommodating portion 1C. In the valve body accommodating portion 1C, a plug side spring 4 (elastic material) is arranged on the vehicle side of the plug side valve body 6 (the side separated from the socket 20: the right side in FIG. 1), and the plug side spring 4 urges the plug side valve body 6 to the socket 20 side (left side in FIG. 1). The plug side valve body 6 and the valve seat 1F form a plug side shutoff valve 5, and the valve seat 1F is composed of a step portion of the valve body accommodating portion 1C. The plug side shutoff valve 5 has a function of shutting off or opening the in-plug flow path 1A. In the state shown in FIG. 1 where the plug 10 and the socket 20 are connected, the plug side shutoff valve 5 is opened and the in-plug flow path 1A communicates with the in-socket flow path 21A.

In FIG. 1, an opening for fitting the locking balls 7 is formed near the tip of the socket 20 side (left side in FIG. 1) of the plug side protruding member 3, and in the state shown in FIG. 1, the locking balls 7 are held in the opening. As will be described later, when the connection between the plug 10 and the socket 20 is released, the locking balls 7 are disengaged from the opening and accommodated in the annular space 21F. The plug side rod 2 connected to the plug side valve body 6 extends to the socket side (left side in FIG. 1), a flat plate member 2A is provided at the tip thereof. In the state where the plug 10 and the socket 20 are connected (the state show in FIG. 1), the flat plate member 2A contacts with the portion of the locking balls 7 protruding into the internal space 3B of the plug side protruding member 3, so that the plug side rod 2 cannot move to the socket side (left side in FIG. 1) from the position shown in FIG. 1 against the elastic repulsive force of the plug side spring 4. In the state shown in FIG. 1, the locking balls 7 are not located in the annular space 21F. In the state shown in FIG. 1, the flat plate member 2A and the plug side rod 2 cannot move to the socket side (left side in FIG. 1) from the position shown in FIG. 1, so that the plug side valve body 6 is held in a state separated from the plug valve seat 1F, and the shutoff valve 5 on the plug 10 side is held in an open state. In FIG. 1, the reference symbol SS indicates a sealing material (for example, an O-ring).

In FIG. 1, at the end of the socket body 21 of the socket 20 having a cylindrical shape as a whole on the hydrogen filling apparatus (not shown) side (upper side in FIG. 1), a hydrogen gas introduction port 21B for introducing hydrogen gas supplied from a hydrogen filling apparatus is provided. A plug 36 is engaged with the hydrogen gas introduction port 21B. The socket body 21 is formed with the in-socket flow path 21A extending in a direction orthogonal to the opening 21C (vertical direction in FIG. 1). An expanded area is formed in the in-socket flow path 21A, and the expanded area constitutes a socket side valve body accommodating portion 21D for accommodating the socket side valve body 25. A support member accommodating portion 21G (a part of the in-socket flow path 21A) is formed on the opening 21C side (lower side show in FIG. 1) of the socket side valve body accommodating portion 21D.

In FIG. 1, the socket 20 has a socket side valve body 25, a socket side spring 23 provided on the filling apparatus side of the socket side valve body 25 (upper in FIG. 1), and a valve body support member 26, and the socket side valve body 25, the socket side spring 23, and the valve body support member 26 are housed in the valve body accommodating portion 21D and the valve body support member accommodating portion 21G, which are internal spaces of the socket body 21. The socket side spring 23 urges the socket side valve body 25 toward the opening 21C (lower side in FIG. 1). The socket side shutoff valve 24 is composed of the socket side valve body 25 and the valve seat 21E, and the valve seat 21E is composed of a step portion of the valve body accommodating portion 21D. The socket side shutoff valve 24 has a function of shutting off or opening the in-socket flow path 21A. As shown in FIG. 1, when the plug 10 and the socket 20 are connected, the socket side shutoff valve 24 is open. At that time, the in-socket flow path 21A communicates the hydrogen gas introduction port 21B with the opening 21C (through hole) of the socket body 21 via the socket side valve body accommodating portion 21D, as shown in FIG. 2, the support member accommodating portion 21G, the hole portion 26C of the valve body support member 26, the annular space 21F, and the hole portion 11B of the rotational shape member 11, and further communicates with the in-plug flow path 1A via the hole 3A and the internal space 3B formed in the plug side protruding member 3.

Figure 2:
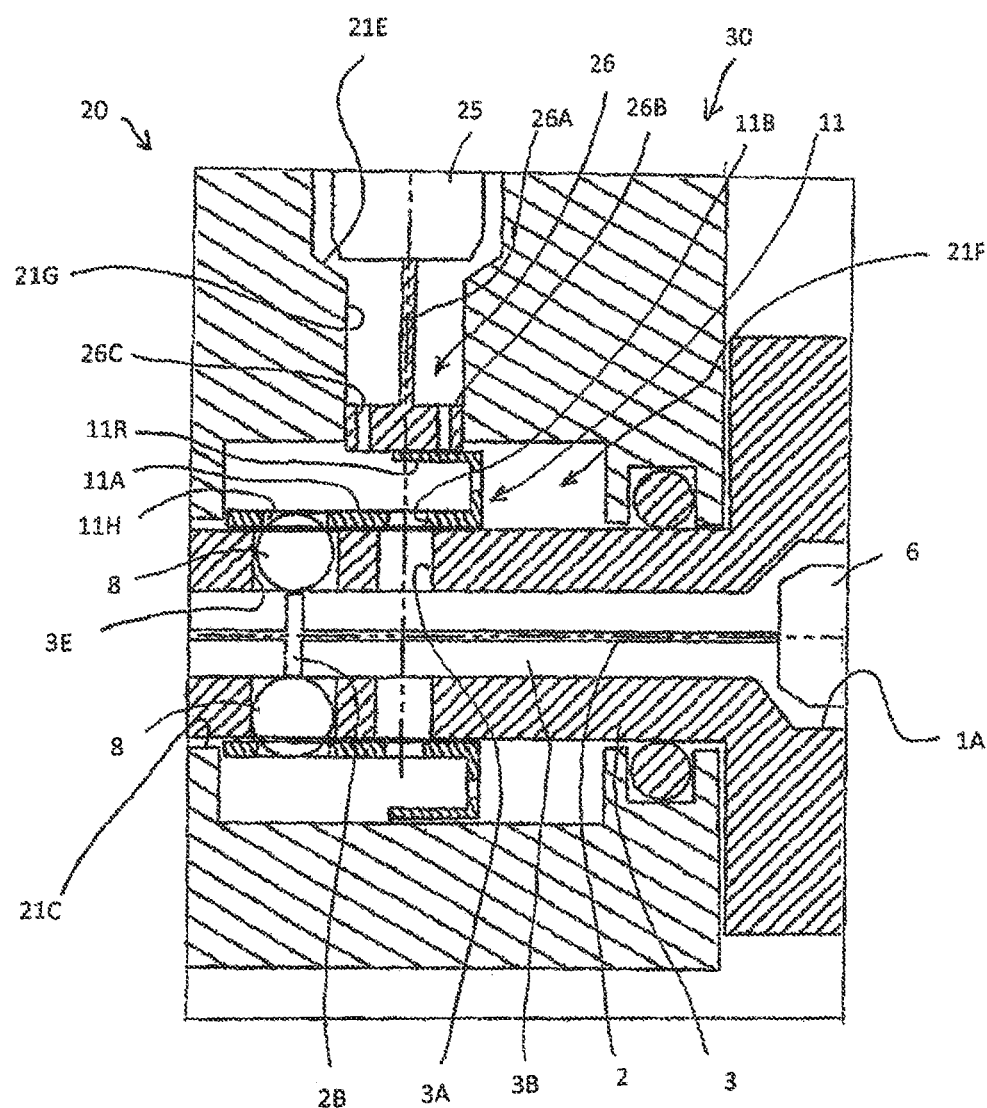
FIG. 2 is an explanatory enlarged view of a valve body supporting member and a rotational shape member shown in FIG. 1.

In FIGS. 1 and 2, the support member 26 (valve body support member) is configured separately from the socket side valve body 25, and has a rod portion 26A and a disk-shaped base portion 26B. When the plug 10 and the socket 20 are connected as shown in FIGS. 1 and 2, the upper end (in FIG. 1) of the rod portion 26A of the valve body support member 26 supports the valve body 25 to separate the valve body 25 from the valve seat 21E, thereby keeping the socket side shutoff valve 24 in the open state. On the other hand, when the plug 10 is disconnected from the socket 20 (FIGS. 3 to 5), the upper end (in FIG. 1) of the rod portion 26A of the valve body support member 26 does not support the valve body 25, and the valve body 25 sits on the valve seat 21E by the elastic repulsive force of the socket side spring 23, and shuts off the socket side shutoff valve 24. Although the base portion 26B of the valve body support member 26 is fitted into the hollow cross section of the support member accommodating portion 21G, the outer diameter and the dimension of the base portion 26B are set such that the base portion 26B is slidable, and a hole 26C is formed in the base 26B as a gas flow path. As a result, in the state shown in FIG. 1, a hydrogen gas flows from the in-socket flow path 21A to the internal space 3B of the plug side protruding member 3 through the hole 26C, and a hydrogen gas flow path from the hydrogen gas introduction port 21B of the socket 20 to the hydrogen gas supply port 1B of the plug 10 is configured.

Figure 3:
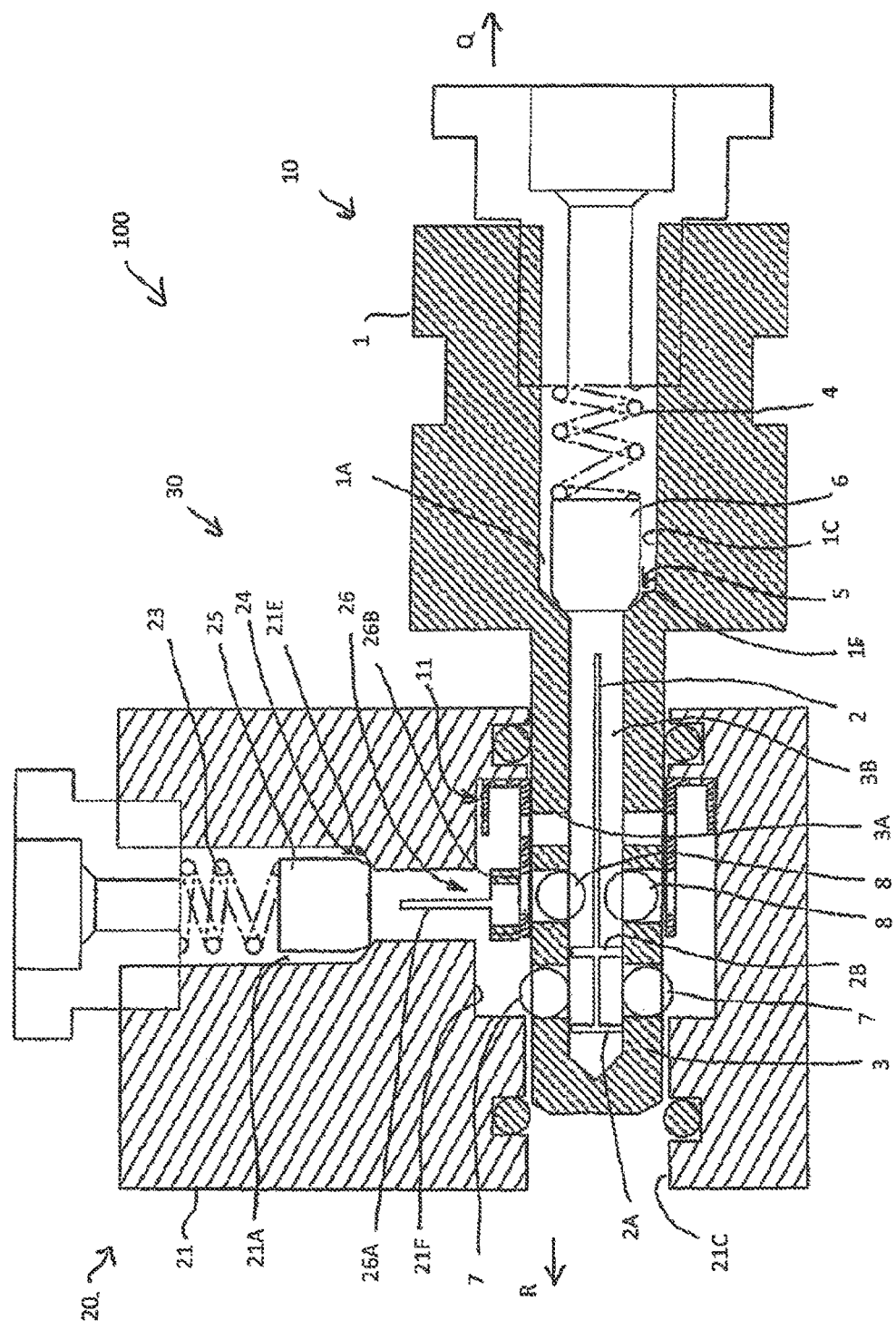
FIG. 3 is an explanatory cross-sectional view of a state in which shut off valves of the plug and the socket are closed at the initial stage when the plug is disconnected from the socket in the safety joint shown in FIG. 1.

The safety joint 100 according to the first embodiment shown in the figures has a socket side flow path cutoff mechanism 30 (filling apparatus side member flow path cutoff mechanism), the socket side flow path cutoff mechanism 30 has a function of instantaneously closing the in-socket flow path 21A at the initial stage (see FIG. 3) when the plug 10 is disconnected from the socket 20. The socket side flow path cutoff mechanism 30 includes a socket side valve body 25 provided in the in-socket flow path 21A; a socket side spring 23 (elastic member) that urges the valve body 25; a valve body support member 26 that supports (places) the socket side valve body 25; and a rotational shape member 11 described later provided in the annular space 21F. The rotational shape member 11 is provided with a folded-back portion 11R (FIG. 2). When the plug 10 and the socket 20 are connected, the base portion 26B of the valve body support member 26 is placed (supported) on the folded-back portion 11R of the rotational shape member 11. On the other hand, in the initial stage where the plug 10 moves out of the socket 20 (disengages from the socket 20), as shown in FIG. 3, the base portion 26B is not placed (supported) on the folded-back portion 11R of the rotational shape member 11, so that the valve body support member 26 moves (drops) to the plug side (lower side in FIG. 1) and does not support the socket side valve body 25.

As shown in FIGS. 1 and 2, the rotational shape member 11 has the folded-back portion 11R and a body portion 11A (FIG. 2), and is formed in a rotating body shape that is complementary to the outer peripheral surface of the plug side protruding member 3. On the side of the body 11A separated from the plug 10 (left side show in FIGS. 1 and 2), as shown in FIG. 2, a through hole 11H into which a rotational shape member locking balls 8 are fitted is formed, and a hole portion 11B forming a flow path is formed in the body portion 11A. A plurality (for example, two) of the rotational shape member locking balls 8 are provided at intervals in the circumferential direction of the plug side protruding member 3, the rotational shape member locking balls 8 are fitted into a through hole 3E formed in the plug side protruding member 3, and a part of the rotational shape member locking ball 8 is fitted into the through hole 11H of the rotational shape member 11.

A ball support member 2B, which is a flat plate member, is provided at a predetermined position of the plug side rod 2 extending from the plug side valve body 6 to the socket side (left side in FIG. 1). The predetermined position is a position of the rotational shape member locking balls 8 in the rod extending direction position in a state where the plug 10 and the socket 20 are connected (FIGS. 1 and 2). The rotational shape member locking balls 8 do not move inward in the radial direction when the plug 10 and the socket 20 are connected (FIGS. 1 and 2) by contacting, at the inner portion thereof in the radial direction, with the ball support member 2B. With the plug 10 and the socket 20 connected, the ball support member 2B supports the rotational shape member locking balls 8 so as not to move inward in the radial direction, so that the rotational shape member 11 is integrated with the plug side protruding member 3 via the rotational shape member locking balls 8 and the through hole 11H. In the state where the plug 10 and the socket 20 are connected (FIGS. 1 and 2), the socket side valve body 25 is supported by the rod portion 26A of the valve body support member 26 mounted (supported) on the folded-back portion 11R of the rotational shape member 11, the socket side valve body 25 is held at a position separated from the socket side valve seat 21E against the elastic repulsive force of the socket side spring 23, and the socket side shutoff valve 24 is held in an open state.

In FIG. 1, for example, when a fuel cell vehicle (FCV: not shown) suddenly starts while hydrogen gas is filled, and a large tension acts on a filling hose (not shown), the plug 10 comes out of the socket 20 and moves in the direction of the arrow Q. When the plug moves in the direction of the arrow Q, the locking balls 7 also move in the direction of the arrow Q (on the right side in FIG. 1) and come to the position of the annular space 21F. When the locking balls 7 reach the annular space 21F, the locking balls 7 on which the elastic repulsive force of the plug side spring 4 acts via the flat plate member 2A move outward in the radial direction and enter the annular space 21F. When the locking balls 7 enter the annular space 21F, the locking balls 7 do not come into contact with the flat plate member 2A of the plug side rod 2, so that the flat plate member 2A at an end of the plug side rod 2 is not restricted from moving on the arrow R side (left side in FIG. 1) by the locking balls 7. As a result, as shown in FIG. 3, the plug side valve body 6 and the plug side rod 2 move to the arrow R side due to the elastic repulsive force of the plug side spring 4, the plug side valve body 6 sits on the plug side valve seat 1F, and the shutoff valve 5 of the plug is closed (the flow path 1A in the plug is shut off). Then, a high-pressure hydrogen gas existing on the plug 10 side cannot flow out from the plug side valve body 6 to the socket 20 side (arrow R side).

As described above, in the state shown in FIGS. 1 and 2, the rotational shape member locking balls 8 are fitted into the through hole 11H of the rotational shape member 11 and are fitted into the through hole 3E of the plug side protrusion 3, so that when the plug 10 is disconnected from the socket 20 and moves in the direction of the arrow Q, the rotational shape member 11 also moves in the direction of the arrow Q together with the plug side protruding member 3. When the rotational shape member 11 moves in the direction of the arrow Q, the valve body support member 26 is no longer placed on the rotational shape member 11, and is not supported. Consequently, as shown in FIG. 3, the socket side valve body 25 and the valve body support member 26 move (drop) to the opening 21C side (downward in FIGS. 1 to 3) due to the elastic repulsive force of the socket side spring 23; the socket side valve body 25 sits on the socket side valve seat 21E; the socket side shutoff valve 24 is closed; and the in-socket flow path 21A is shut off. In other words, at the initial stage when the plug 10 is disconnected from the socket 20, the rotational shape member 11 moves in the direction of the arrow Q; the valve body support member 26 is not mounted on the rotational shape member 11; the valve body support member 26 is not mounted on the rotational shape member 11; due to the elastic repulsive force of the socket side spring 23; the socket side valve body 25 instantly sits on the socket side valve seat 21E; and the socket side shutoff valve 24 is closed. As a result, unlike the prior art (FIG. 12), outgas is hardly generated.

Further, at the initial stage when the plug 10 is disconnected from the socket 20, when the locking balls 7 reach the annular space 21F, the restriction on the movement of the flat plate member 2A at an end of the plug side rod 2 to the arrow R side (left side in FIGS. 1 to 3) by the locking balls 7 are released, and due to the elastic repulsive force of the plug side spring 4, the plug side valve body 6 instantly sits on the plug side valve seat 1F to close the plug side shutoff valve 5, and accordingly a high pressure hydrogen gas existing on the plug 10 side does not flow out from the valve body 6 in the arrow Q direction (socket side). That is, in the safety joint 100 according to the first embodiment, when the connection between the plug 10 and the socket 20 is released, even in the initial stage shown in FIG. 3, the plug side shutoff valve 5 and the socket side shutoff valve 24 are instantly closed, and both the in-plug flow path 1A and the in-socket flow path 21A are cut off. As a result, a hydrogen gas is prevented from flowing out from the plug 10 side, and is also prevented from flowing out from the socket 20 side.

Figure 4:
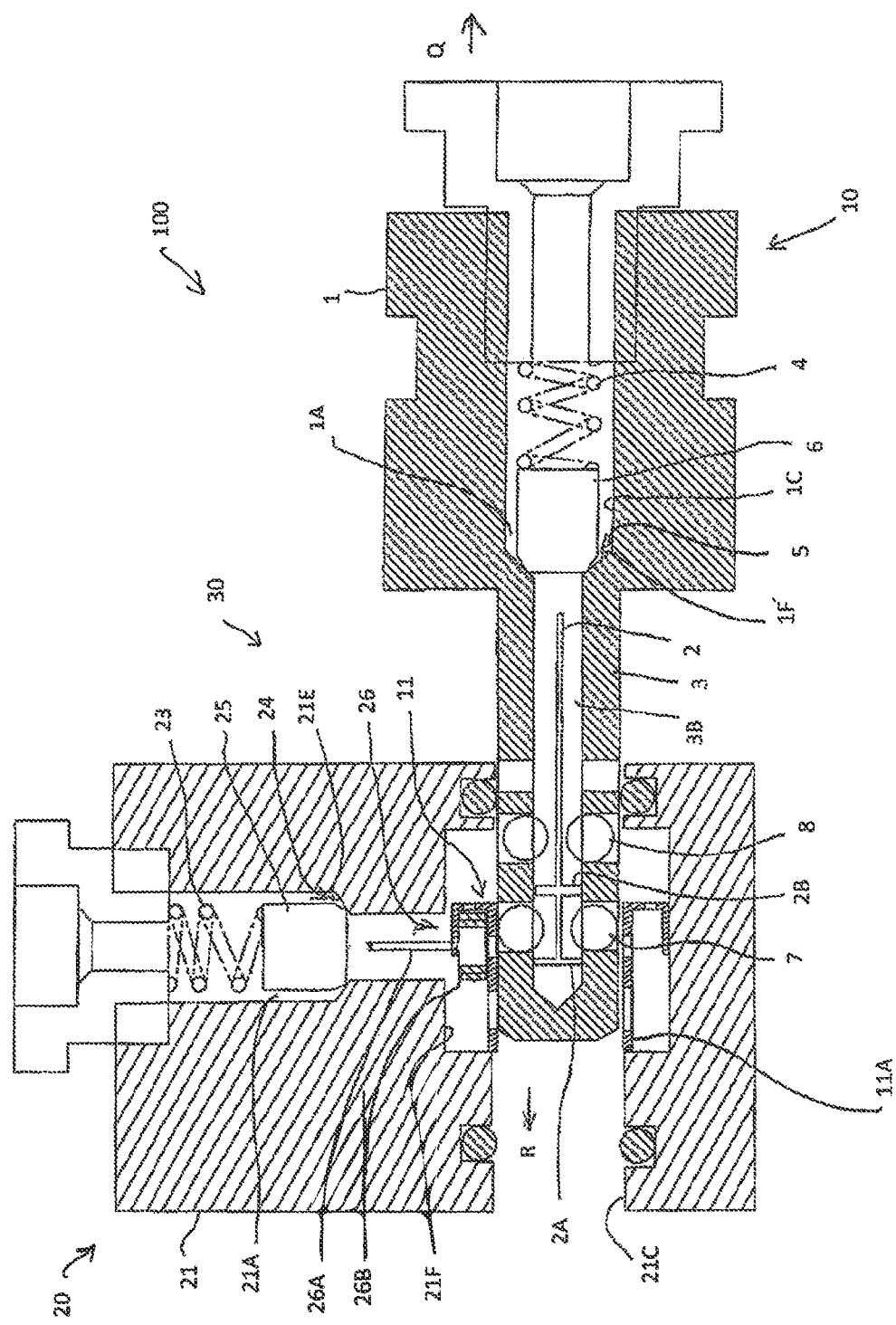
FIG. 4 is an explanatory cross-sectional view showing a state in which the plug is further disconnected from the socket from the state show in FIG. 3.

As shown in FIG. 3, when the valve body support member 26 moves to the opening 21C side (lower side in FIG. 1) of the socket body 21 due to the elastic repulsive force of the socket side spring 23, the valve body support member 26 reaches the portion of the rotational shape member 11 where the through port 11H (FIG. 2) is formed. From the state shown in FIG. 3, the plug 10 is further disconnected from the socket 20 (moves in the direction of the arrow Q), and the plug 10 is further disconnected from the socket 20, and in the state shown in FIG. 4, the hydrogen gas accumulated in the annular space 21F and the opening 21C flows out in the direction of the arrow R (leftward in FIG. 4). Though the rotational shape member 11 also moves in the direction of the arrow R by being taken by the outflowing hydrogen gas, the body portion 11A of the rotational shape member 11 contacts with the inner wall on the arrow R direction side of the annular space 21F, and the rod portion 26A of the valve body support member 26 extends into the in-socket flow path 21A, so that the valve body support member 26 is held at the position shown in FIG. 3 (the position in the in-socket flow path 21A). As a result, as shown in FIG. 4, the base portion 26B of the valve body support member 26 is surrounded by the folded-back portion 11R (FIG. 2) and the body portion 11A (FIG. 2) of the rotational shape member 11.

Figure 5:
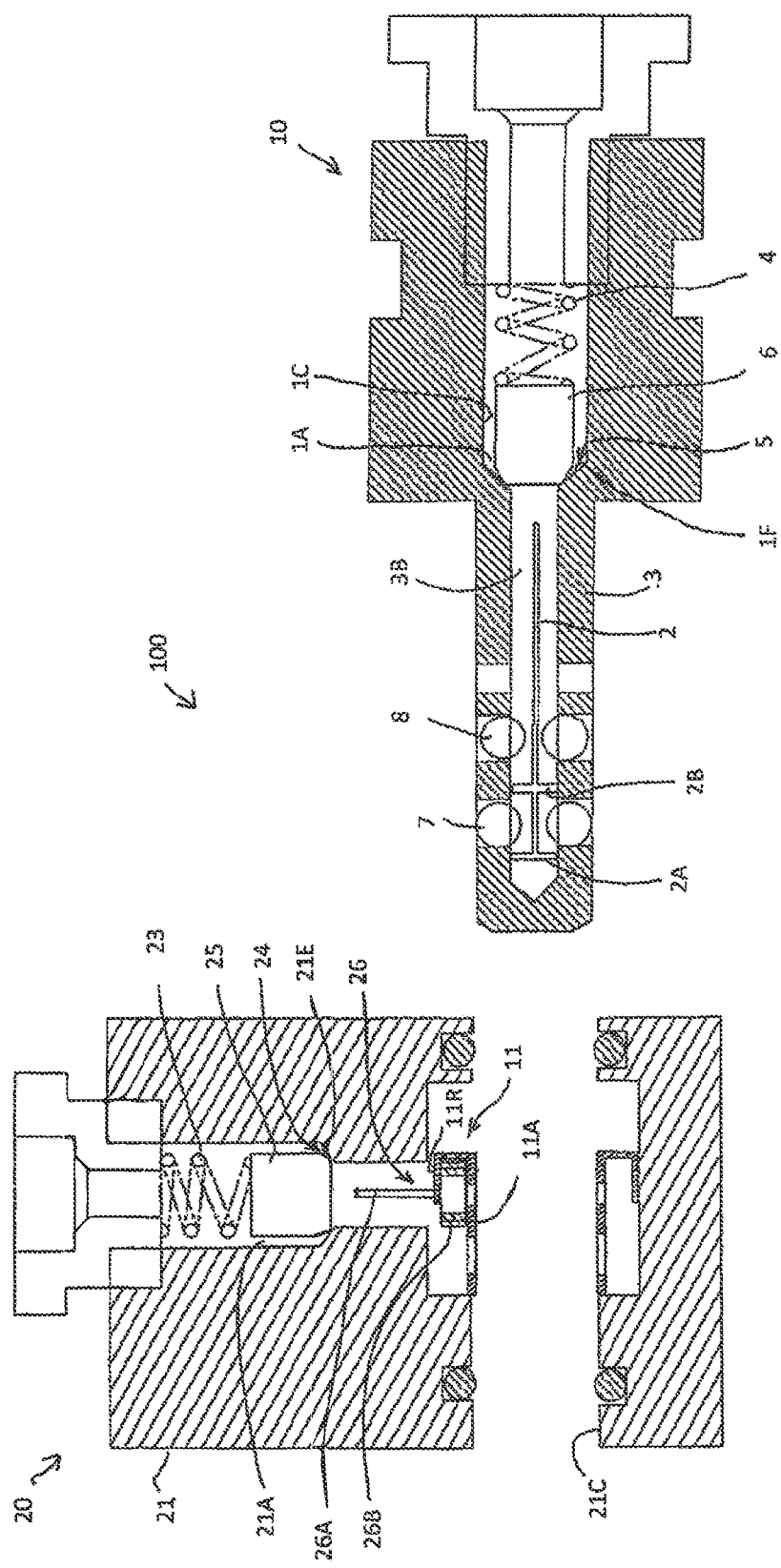
FIG. 5 is an explanatory enlarged view showing a state in which the plug is completely disconnected from a socket in the first embodiment.
Figure 6:
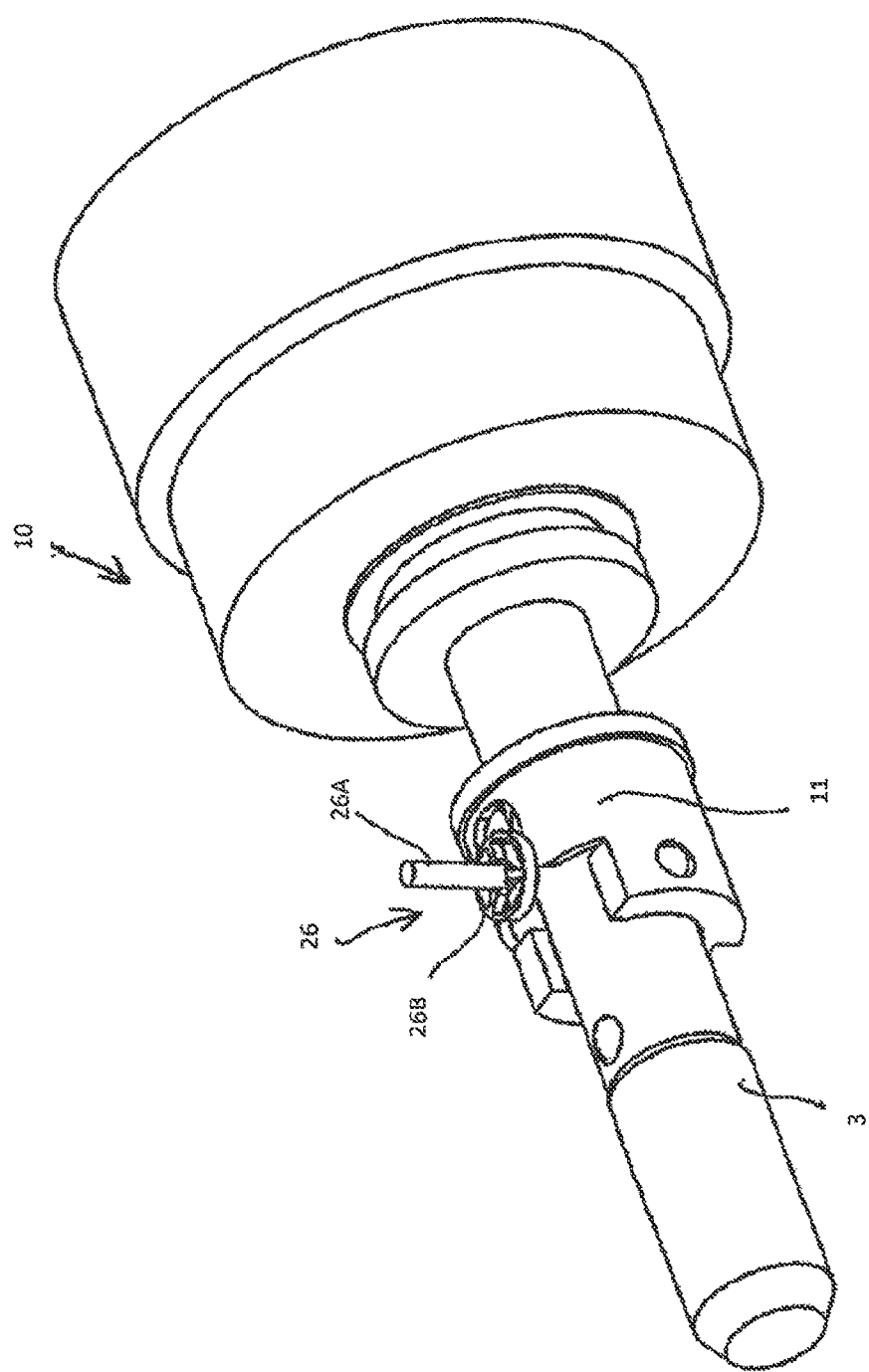
FIG. 6 is an explanatory perspective view showing a state in which a base portion of a valve body support member is surrounded and held by a folded-back portion of a rotational shape member in the states show in FIGS. 4 and 5.

The state in which the base portion 26B of the valve body support member 26 is surrounded by (the folded-back portion 11R and the body portion 11A of) the rotational shape member 11 is shown three-dimensionally in FIG. 6. In FIG. 6, the members on the socket 20 side other than the valve body support member 26 (rod portion 26A, base portion 26B) are not shown for the sake of explanation. As a result of the socket support member 5 being surrounded by the folded-back portion 11R and the body portion 11A of the rotational shape member 11, even if the plug side protruding member 3 moves in the direction of the arrow Q, as shown in FIG. 4, the valve body support member 26 surrounded by the rotational shape member 11 is held at a position directly below the in-socket flow path 21A, and does not go out from the opening 21C to the outside of the safety joint 100, and is not taken to the plug 10. The same is true even if the plug 10 is completely disconnected from the socket 20 as shown in FIG. 5.

As described above, the valve body support member 26 surrounded by the rotational shape member 11 is held at a position directly below the flow path 26 in the socket, and does not move in the direction of the arrow Q (direction in which the plug 10 is removed) or in the direction of the arrow R (direction opposite to the direction in which the plug 10 is removed). As a result, when the plug 10 is disconnected from the socket 20, the rotational shape member 11 and the valve body support member 26 are prevented from interfering with other members or becoming a so-called "bitten" state. Further, when the plug 10 is completely disconnected from the socket 20, the rotational shape member 11 and the valve body support member 26 are prevented from moving to the outside of the safety joint 100 and being lost. The rotational shape member 11 and the valve body support member 26 can be reused accordingly.

With the safety joint 100 according to the first embodiment show in FIGS. 1 to 6, the socket side flow path blocking mechanism 30 is provided to instantly close the in-socket flow path 21A at the initial stage when the plug 10 is disconnected from the socket 20, and the socket side flow path cutoff mechanism 30 includes the socket side valve body 25 provided in the in-socket flow path 21A, the socket side spring 23 that urges the valve body 25, and the valve body support member 26 and the rotational shape member 11 that support (place) the socket side valve body 25. When the plug 10 and the socket 20 are connected, the valve body support member 26 is placed (supported) on the rotational shape member 11 to support the socket side valve body 25, on the other hand, at the initial stage when the plug 10 is disconnected from the socket 20, the movement of the plug 10 causes the socket side valve body 25 to be unsupported, so that when the rotational shape member 11 moves together with the plug 10 at the initial stage when the plug 10 is disconnected from the socket 20, the folded-back portion 11R of the rotational shape member 11 no longer supports (places) the valve body support member 26, and the valve body support member 26 does not support the socket side valve body 25. As a result, in the initial stage when the plug 10 is disconnected from the socket 20, the valve body support member 26 changes to a state in which the socket side valve body 25 is not supported (mounted), the socket side valve body 25 that is not supported by the valve body support member 26 is pressed by the socket side spring 23 and sits on the socket side valve seat 21E, so that the socket side shutoff valve 24 is shut off to suppress the generation of outgas.

Further, in the safety joint 100 of the first embodiment, the rotational shape member 11 is provided with the folded-back portion 11R, after the valve body support member 26 changes to a state in which the socket side valve body 25 is not supported (not mounted) at the initial stage when the plug 10 is disconnected from the socket 20, and is taken away when a hydrogen gas accumulated in the annular space 21F and the opening 21C escapes in the arrow R direction (left direction in FIG. 4), and the folded-back portion 11R of the rotational shape member 11 moves to a position surrounding the valve body support member 26. With this, the valve body support member 26 surrounded by (the folded-back portion 11R of) the rotational shape member 11 and the rotational shape member 11 do not interfere with other parts and are prevented from being lost. Consequently, the valve body support member 26, the rotational shape member 11, and other parts can be reused.

Figure 7:
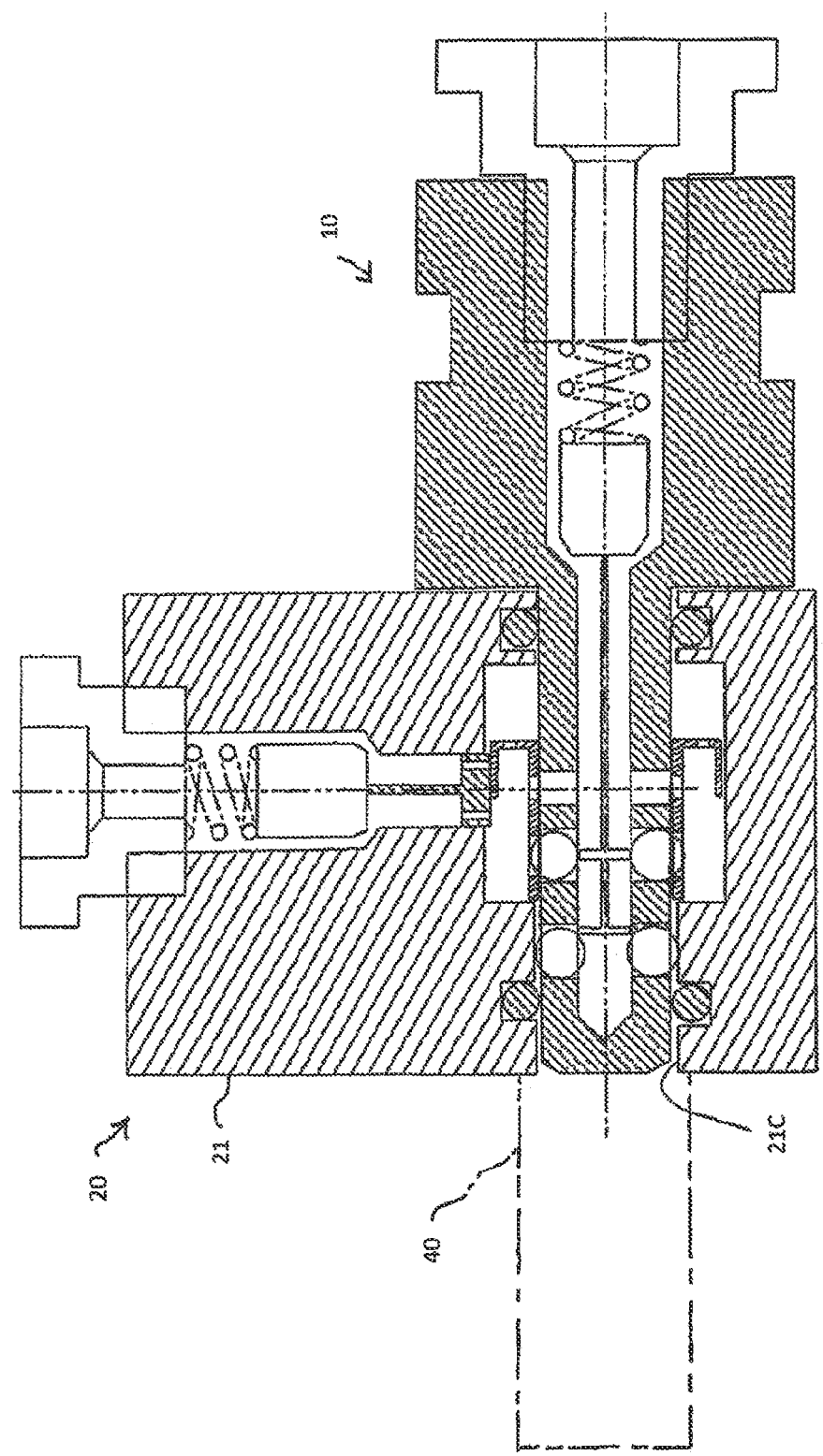
FIG. 7 is an explanatory cross-sectional view showing a safety joint according to a modification example of the first embodiment.

A modified example of the first embodiment show in FIGS. 1 to 6 will be described with reference to FIG. 7. In the modified example show in FIG. 7, a silencer 40 is provided on the side (left side in FIG. 7) of the opening 21C (through hole) of the socket body 21 separated from the plug 10, and the noise when the plug 10 comes out of the socket 20 is reduced. Other configurations and operational effects in the modified example show in FIG. 7 are the same as those of the first embodiment show in FIGS. 1 to 6.

Figure 8:
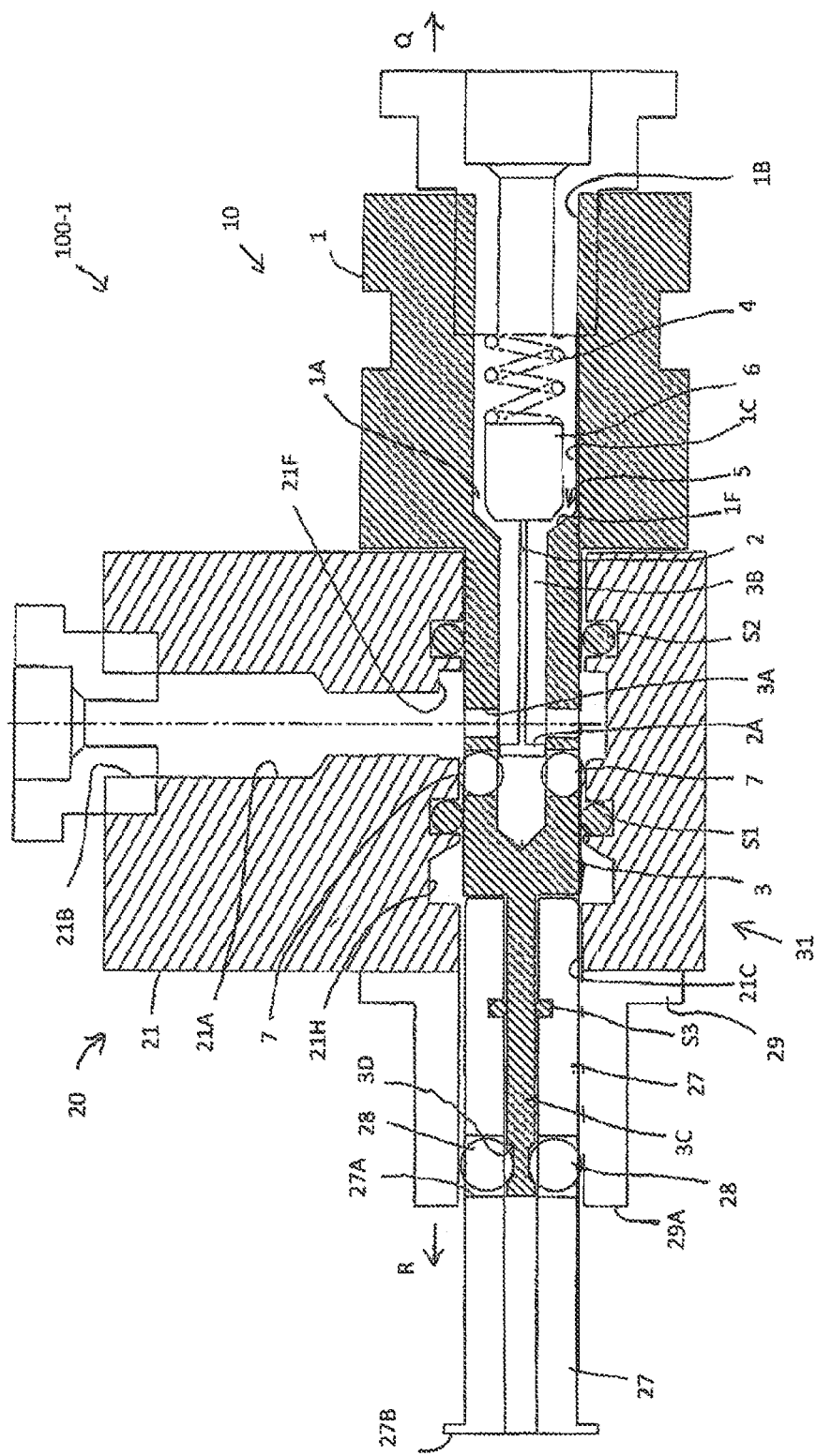
FIG. 8 is an explanatory cross-sectional view of a safety joint according to the second embodiment of the present invention in a state where a plug is connected to a socket.

Next, the second embodiment of the present invention will be described with reference to FIGS. 8 to 10. In explaining the second embodiment, the members (plug, socket, valve body, shutoff valve, in-plug flow path, in-socket flow path, etc.) common to the first embodiment are designated by the same reference numerals to avoid complication. In the following description, the portions where the second embodiment is different from the first embodiment will be mainly described, and the same configuration and operational effects as those of the first embodiment will be briefly described. The safety joint according to the second embodiment, which is indicated by the reference numeral 100-1, is shown in FIG. 8 in a state where the plug 10 (nozzle side member) and the socket 20 (filling apparatus side member) are connected. The plug 10 having a cylindrical shape as a whole has a plug body 1 and a plug side protruding member 3 protruding toward the socket 20, a rod-shaped portion 3C is provided at the tip of the socket 20 side (left side in FIG. 8) of the plug side protruding member 3, and a groove 3D into which the plug member locking balls 28 are fitted is formed in the vicinity of the tip end (left end portion in FIG. 8) of the rod-shaped portion 3C.

As shown in FIG. 8, when the plug 10 and the socket 20 are connected, the plug side protruding member 3 is inserted into the opening 21C formed in the socket body 21. At the end of the plug body 1 on the vehicle side (right side in FIG. 8: the side separated from the socket 20 side), the hydrogen gas supply port 1B connected to a filling hose (not shown) is provided. In the radial center portion (vertical center portion in FIG. 8) of the plug body 1 and the plug side protruding member 3, the in-plug flow path 1A extending in the axial direction of the plug 10 (left-right direction in FIG. 8) is formed. The in-plug flow path 1A extends from the flow path in the plug side protruding member 3 (internal space 3B of the plug side protruding member 3) to the hydrogen gas supply port 1B via the flow path in the plug side valve body accommodating portion 1C. Further, the hole 3A is formed in the plug side protruding member 3, and the flow path 1A in the plug and the in-socket flow path 21A communicate with each other through the annular space 21F, which is an enlarged diameter portion of the hole 3A and the opening 21C, The plug side rod 2 is housed in the in-plug flow path 1A, and the plug side valve body 6 is provided at the tip of the plug side rod 2 on the side separated from the socket 20 (on the right side in FIG. 8). In the valve body accommodating portion 1C, the plug side spring 4 (elastic material) is arranged on the vehicle side of the plug side valve body 6 (the side separated from the socket 20: the right side in FIG. 8), and the plug side spring 4 urges the plug side valve body 6 to the socket 20 side (left side in FIG. 8). The plug side valve body 6 and the valve seat 1F constitute the plug side shutoff valve 5. The plug side shutoff valve 5 has a function of shutting off or opening the flow path 1A in the plug. In the state where the plug 10 and the socket 20 shown in FIG. 8 are connected, the plug side shutoff valve 5 is opened and the in-plug flow path 1A communicates with the in-socket flow path 21A.

Figure 9:
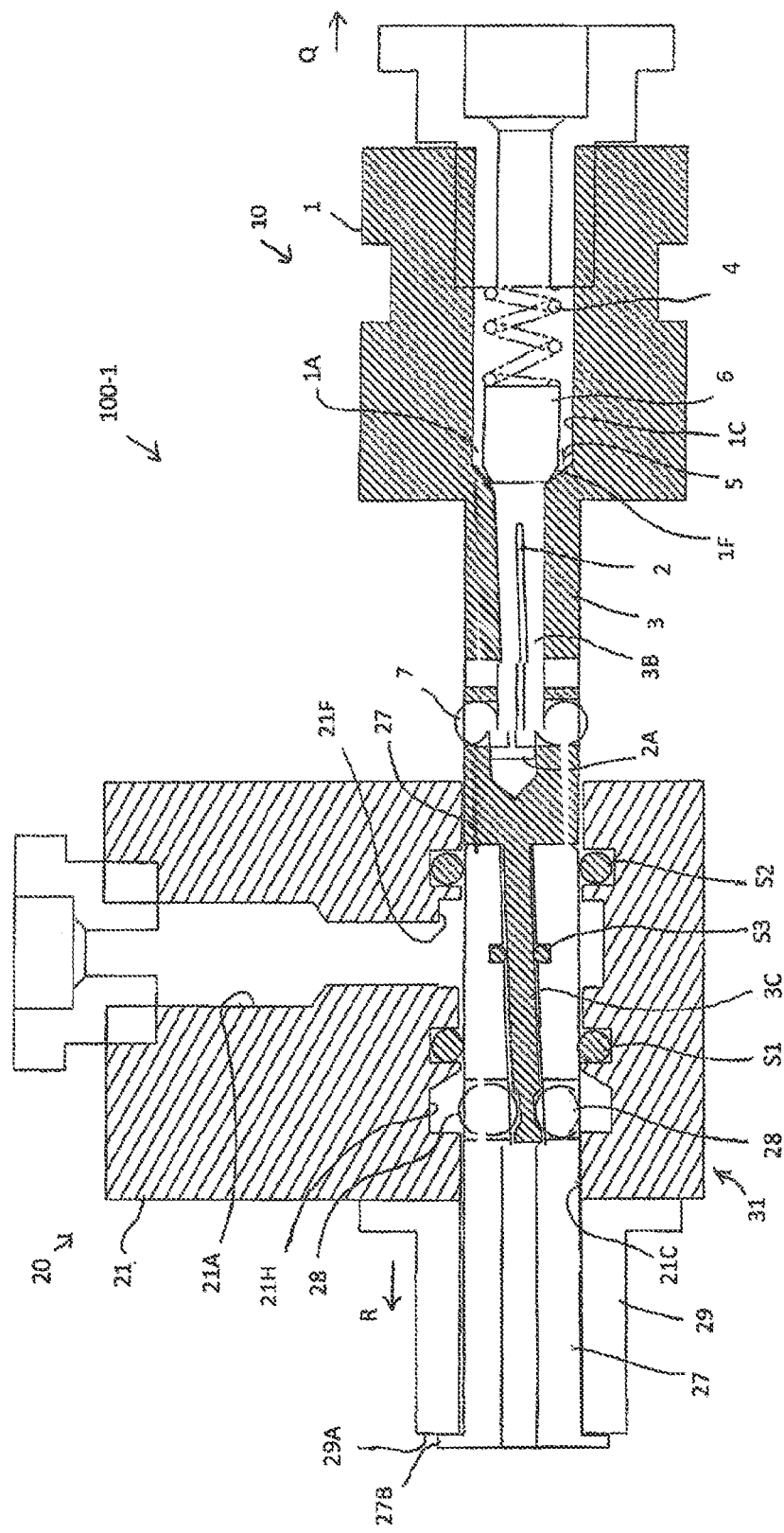
FIG. 9 is an explanatory cross-sectional view showing a state in which the plug is disconnected from the socket and shutoff valves of the plug and the socket are closed in the safety joint show in FIG. 8.
Figure 10:
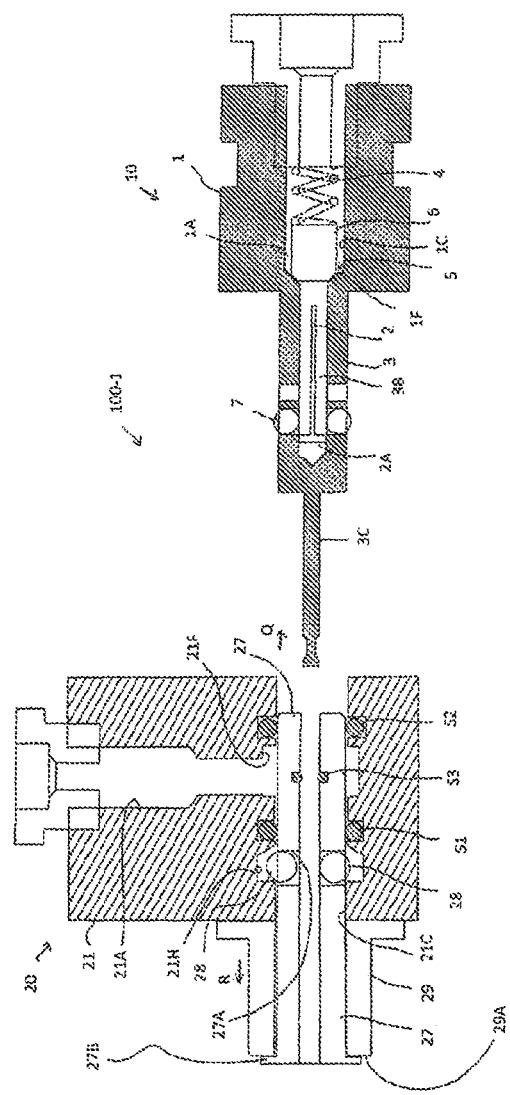
FIG. 10 is an explanatory enlarged view showing a state where the plug is completely disconnected from the socket in the second embodiment.
Figure 11:
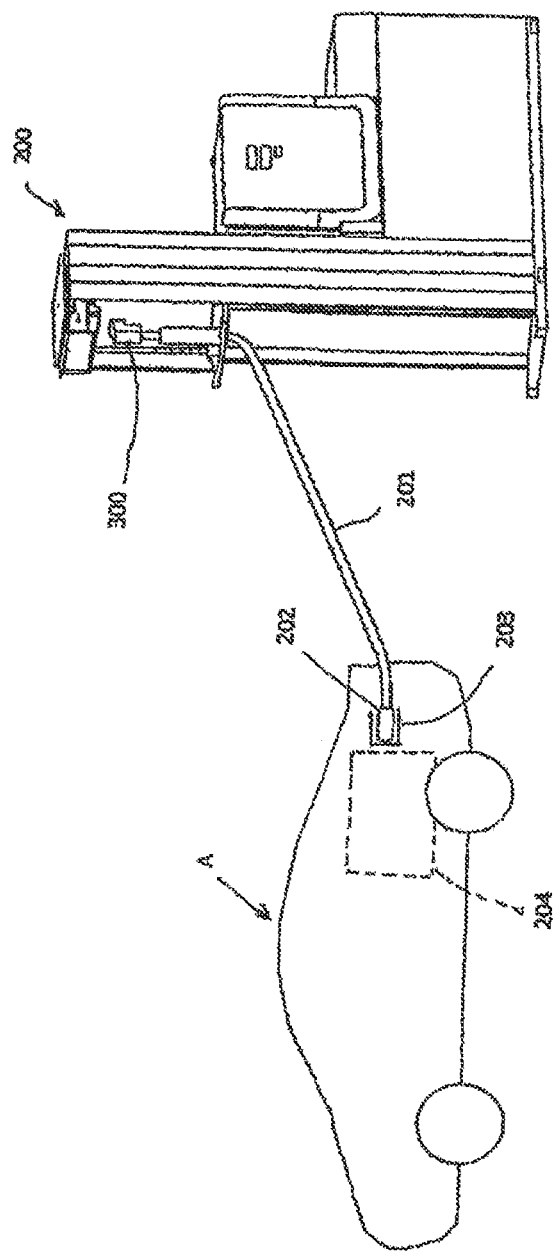
FIG. 11 is a block diagram showing an outline of a hydrogen filling facility.

The mechanism that the plug side shutoff valve 5 is opened when the plug 10 and the socket 20 are connected, and the plug side shutoff valve 5 is closed instantly when the plug 10 starts to be disconnected from the socket 20 is the same for both the second embodiment show in FIGS. 8 to 10 and the first embodiment show in FIGS. 1 to 6. That is, when the plug 10 and the socket 20 are connected, the locking balls 7 are held in the opening formed on the socket 20 side (left side in FIG. 8) of the plug side protruding member 3. When the connection between the plug 10 and the socket 20 begins to be released, the locking balls 7 are housed in the annular space 21F formed by the enlarged diameter portion of the opening 21C of the socket body 21. The flat plate member 2A is provided at the tip of the plug side rod 2, and when the plug 10 and the socket 20 are connected, the flat plate member 2A is in contact with a portion of the locking balls 7 that protrude into the internal space 3B of the plug side protruding member 3. Consequently, the plug side rod 2 does not move to the arrow R side (socket 20 side: left side in FIG. 8) against the elastic repulsive force of the plug side spring 4, the plug side valve body 6 is held in a state of being separated from the plug valve seat 1F, and the plug 10 side shutoff valve 5 is in the open state. In FIGS. 8 to 10, reference numerals S1, S2, and S3 are sealing materials (for example, O-rings).

In FIG. 8, in the socket body 21 of the socket 20 having a cylindrical shape as a whole is formed the flow path 21A in the socket in a direction orthogonal to the plug side protruding member 3 (vertical direction in FIG. 8: a direction orthogonal to the opening 21C), and the in-socket flow path 21A communicates the hydrogen gas introduction port 21B at the end of the hydrogen filling apparatus side (upper side in FIG. 8) with the opening 21C (not shown). In the second embodiment, unlike the first embodiment, the socket side spring, the socket side valve body, and the socket side shutoff valve are not provided in the in-socket flow path 21A. As shown in FIG. 8, when the plug 10 and the socket 20 are connected, the in-socket flow path 21A communicates with the in-plug flow path 1A through the annular space 21F that is the enlarged diameter portion of the opening portion 21C and the hole portion 3A formed in the plug side protruding member 3, In FIG. 8, the plug member 27 is slidably inserted into the opening 21C of the socket 20 (socket body 21). In the cylindrical plug member 27, in the state where the plug 10 and the socket 20 are connected (the state shown in FIG. 8), an opening 27A of the plug member 27 is set so as to face the groove 3D formed in the rod-shaped portion 3C of the plug side protruding member 3. The plug member locking balls 28 are fitted in the groove 3D of the rod-shaped portion 3C and the opening 27A of the plug member 27, and the rod-shaped portion 3C of the plug side protruding member 3 and the plug member 27 are connected to each other via the plug member locking balls 28 and move integrally. As a result, when the plug 10 is disconnected from the socket 20 and moves in the direction of the arrow Q, the plug member 27 also moves in the direction of the arrow Q at the same time. A flange portion 27B is formed at the end of the plug member 27 on the side separated from the plug 10 (left side in FIG. 8). A plurality (for example, two) of the plug member locking balls 28 are provided. Further, in the opening 21C of the socket body 21, the enlarged diameter portion 21H is formed in a region separated from the plug 10 side of the annular space 21F. As will be described later, when the plug member 27 moves in the direction of the arrow Q at the same time as the connection between the plug 10 and the socket 20 is released, the plug member locking balls 28 are set to be accommodated in the enlarged diameter portion 21H.

In FIG. 8, a cylindrical stopper member 29 is attached to the side surface of the socket body 21 on the arrow R side, and the plug member 27 is slidably inserted into the hollow portion of the stopper member 29 in the axial direction (left-right direction in FIG. 8). The end surface 29A of the stopper member 29 on the side separated from the socket body 21 (arrow R side) has a function as a stopper for contacting with the flange portion 27B of the plug member 27 and stopping the movement of the wire member 27 in the arrow Q direction when the connection between the plug 10 and the socket 20 is released and the plug member 27 moves in the direction of the arrow Q and reaches a predetermined position. In the opening 21C of the socket body 21, sealing materials S1 and S2 (for example, O-rings) are arranged in each region on the arrow R side and the arrow Q side with respect to the in-socket flow path 21A. The sealing materials S1 and S2, when the plug 10 and the socket 20 are connected (FIG. 8), have a function of preventing a high-pressure gas (hydrogen gas or the like) from leaking from the boundary between the outer peripheral surface of the plug side protruding member 3 and the inner peripheral surface of the opening 21C. Further, when the connection between the plug 10 and the socket 20 is released (FIGS. 9 and 10), they have a function of preventing a high-pressure gas (hydrogen gas or the like) from leaking from the boundary between the outer peripheral surface of the plug member 27 and the inner peripheral surface of the opening 21C. Further, a sealing material S3 is arranged on the inner peripheral surface of the plug member 27, and the sealing material S3 seals the boundary between the outer peripheral surface of the rod-shaped portion 3C of the plug side protruding member 3 and the inner peripheral surface of the plug member 27.

The safety joint 100-1 according to the second embodiment has a socket side flow path cutoff mechanism 31 (filling apparatus side member flow path cutoff mechanism) that instantly closes the in-socket flow path 21A at the initial stage when the plug 10 is disconnected from the socket 20, and the socket side flow path blocking mechanism 31 includes the plug member 27, the sealing materials S1 and S2 arranged in the opening 21C of the socket body 21, and the stopper member 29. Further, the safety joint 100-1 is provided with a mechanism for releasing the connection between the plug member 27 and the plug side protruding member 3 when the plug 10 is disconnected from the socket 20, and the mechanism includes: the groove 3D formed in the rod-shaped portion 3C of the plug side protruding member 3; the opening 27A formed in the plug member 27; the plug member locking balls 28 fitted in the groove 3D and the opening 27A; the diameter expansion portion 21H in the opening 21C of the socket 20; the flange portion 27B at an end of the plug member 27; and the end face 29A of the stopper member 29 provided on the socket body 21.

In FIG. 8, for example, when a fuel cell vehicle (FCV: not shown) suddenly starts while hydrogen gas is filled, and a large tension acts on a filling hose (not shown), as the plug 10 tries to come out of the socket 20, the plug 10 moves in the direction of the arrow Q. When the plug 10 moves in the direction of the arrow Q, the locking balls 7 also move in the direction of the arrow Q and reach the annular space 21F. When the locking balls 7 reach the position of the annular space 21F, the locking balls 7 become movable outward in the radial direction and enters the annular space 21F. When the locking balls 7 enter the annular space 21F, the flat plate member 2A at an end of the plug side rod 2 does not come into contact with the locking balls 7, and the flat plate member 2A is no longer prevented from moving in the direction of the arrow R (left side in FIG. 8) with respect to the locking balls 7. As a result, the plug side valve body 6 moves in the direction of the arrow R due to the elastic repulsive force of the plug side spring 4, and instantly sits on the plug side valve seat 1F, the plug shutoff valve 5 is closed, and the flow path 1A in the plug is cut off. Since the plug shutoff valve 5 is closed, a high-pressure hydrogen gas existing on the plug 10 side does not flow out to the socket 20 side.

As described above, the plug member locking balls 28 are fitted in the groove 3D of the rod-shaped portion 3C of the plug side protruding member 3 and the opening 27A of the plug member 27, so that the rod-shaped portion 3C (plug side protruding member 3) and the plug member 27 are connected to each other via the plug member locking balls 28 and move integrally. With this, if the plug 10 moves in the direction of the arrow Q when it comes off from the socket 20, the plug member 27 also moves in the direction of the arrow Q at the same time. As a result of the plug member 27 moving in the direction of the arrow Q, as shown in FIG. 9, the plug member 27 closes the in-socket flow path 21A and the annular space 21F. Here, the boundary between the plug member 27 and the opening 21C of the socket body 21 is sealed with the sealing materials S1 and S2 (for example, O-rings), so that even if there is no shutoff valve in the in-socket flow path 21A, hydrogen gas in the in-socket flow path 21A is prevented from flowing out to the outside of the safety joint 100-1 through the opening 21C of the socket body 21.

From the state shown in FIG. 8, the plug 10 is disconnected from the socket 20 and moves in the direction of the arrow Q, and in the state shown in FIG. 9, the plug member locking balls 28 reach the enlarged diameter portion 21H at the opening 21C. The movement of the plug 10 in the direction of the arrow Q is converted into a motion of pressing the plug member locking balls 28 outward in the radial direction due to the inclined portion of the groove 3D (see FIG. 8) of the rod-shaped portion 3C of the plug side protruding member 3. Thereby, the plug member locking balls 28 move out of the groove 3D and move inside the enlarged diameter portion 21H (outward in the radial direction). When the plug member locking balls 28 are disconnected from the groove 3D, the rod-shaped portion 3C at the tip of the plug side protruding member 3 and the plug member 27 are not connected (the connection is released), and the rod-shaped portion 3C and the plug side protruding member 3 move relative to the plug member 27, and the connection between the plug 10 and the socket 20 is released to reach the state shown in FIG. 10.

When the connection between the plug 10 and the socket 20 is released, when the flange portion 27B at an end of the plug member 27 comes into contact with the end surface 29A of the stopper member 29 attached to the side surface of the socket body 21 (see FIG. 9), the plug member 27 does not move further to the arrow Q side. As described above, when the plug member locking balls 28 reach the enlarged diameter portion 21H of the opening 21C, the connection between the rod-shaped portion 3C and the plug member 27 is released, the plug side protruding member 3 and the rod-shaped portion 3C move relative to the plug member 27. As a result, as shown in FIG. 10, the plug 10 (including the plug side protruding member 3 and the rod-shaped portion 3C) is disconnected from the socket 20, and the plug member 27 remains in the opening 21C of the socket body 21. Here, in the plug member 27, the distance between the opening 27A and the end face on the plug 10 side (end face on the arrow Q side) is set such that when the flange portion 27B at an end of the plug member 27 contacts with the end surface 29A of the stopper member 29, the end face on the plug 10 side (end face on the arrow Q side) is located in the region on the arrow Q side of the sealing material S2.

The sealing materials S1 and S2 are arranged in the opening 21C of the socket body 21, so that as shown in FIG. 10, even when the plug 10 is completely disconnected from the socket 20, the in-socket flow path 21A is closed by the plug member 27, and the sealing material S2 prevents a high pressure hydrogen gas in the in-socket flow path 21A from leaking in the direction of the arrow Q through the boundary between the outer peripheral surface of the plug member 27 and the inner peripheral surface of the opening 21C of the socket body 21. Further, the sealing material S1 prevents a high-pressure hydrogen gas in the in-socket flow path 21A from leaking in the direction of the arrow R through the boundary between the outer peripheral surface of the plug member 27 and the inner peripheral surface of the opening 21C of the socket body 21. Here, the operation of closing the in-socket flow path 21A by the plug member 27 is instantaneously performed at the initial stage of disconnection between the plug 10 and the socket 20, and outgas can be suppressed. That is, in both the state where the plug 10 and the socket 20 shown in FIG. 10 are completely disconnected and the state where the plug side protruding member 3 shown in FIG. 9 remains in the opening 21C of the socket body 21, the in-socket flow path 21A is closed and outgas is suppressed. In other words, with the safety joint 100-1 according to the second embodiment, even in the early stage when the plug 10 is disconnected from the socket 20 shown in FIG. 9, the plug side shutoff valve 5 shuts off the flow path 1A in the plug, and the plug member 27 shuts off the in-socket flow path 21A, so that hydrogen gas is prevented from flowing out to the outside of the safety joint 100-1.

Here, when the plug 10 is separated from the socket 20, there is no member that prevents or interferes with the movement of the plug 10 in the direction of the arrow Q (so-called "biting" state). Further, in a state where the plug 10 is disconnected from the socket 20 (FIG. 10), all members of the plug 10 and socket 20 are engaged with other members, and there is no single free member (free state), so that there is no member that is lost from the plug 10 and the socket 20. With this, all the members of the safety joint 100-1 can be reused.

According to the safety joint 100-1 of the second embodiment of the present invention shown in FIGS. 8 to 10, the socket side flow path cutoff mechanism 31 is provided to instantly close the in-socket flow path 21A at the initial stage when the plug 10 is disconnected from the socket 20, the socket side flow path blocking mechanism 31 includes the plug member 27 connected to the plug side protruding member 3, the sealing materials S1 and S2 arranged in the opening 21C of the socket body 21, the stopper member 29, and the sealing materials S1 and S2, and prevents a high pressure gas (hydrogen gas, etc.) from leaking when the plug 10 and the socket 20 are connected (FIG. 8) through the boundary between the outer peripheral surface of the plug side protruding member 3 and the inner peripheral surface of the opening 21C, and when the connection between the plug 10 and the socket 20 is released (FIGS. 9 and 10), a high pressure gas (hydrogen gas or the like) is prevented from leaking through the boundary between the outer peripheral surface of the plug member 27 and the inner peripheral surface of the opening 21C. With this construction, in the initial stage (FIG. 9) when the plug 10 is disconnected from the socket 20, the plug side protruding member 3 of the plug 10 is positioned so as to close the in-socket flow path 21A, and when the plug 10 is completely disconnected from the socket 20 (FIG. 10), the plug member 27 closes the in-socket flow path 21A. Then, the sealing materials S1 and S2 seal the boundary between the outer peripheral surfaces of the plug side protruding member 3 and the plug member 27 and the inner peripheral surface of the opening 21C of the socket body 21, so that a high-pressure gas in the in-socket flow path 21A is prevented from leaking from the opening 21C. The in-socket flow path 21A is accordingly closed at the initial stage of disconnection between the plug 10 and the socket 20, and the generation of outgas as in the prior art is suppressed.

Further, even if the plug 10 is disconnected from the socket 20, the plug member 27 does not fall off from the opening 21C of the socket body 21, thereby there is no risk of loss. And, when the plug 10 comes off the socket 20, the plug member 27 only slides on the opening 21C of the socket body 21, and other members do not interfere with the plug 10 or the plug member 27 (they do not "bite"). Consequently, even if the plug 10 is disconnected from the socket 20, all the members can be reused. Other configurations and operational effects in the second embodiment show in FIGS. 8 to 10 are the same as those of the first embodiment show in FIGS. 1 to 7.

Since the embodiments shown in the drawings are merely examples, and the embodiments do not limit the technical scope of the present invention.

DESCRIPTION OF THE REFERENCE NUMERALS 1 plug body
1A in-plug passage (passage of nozzle side member)
2 plug side rod (rod of nozzle side member)
3 plug side protruding member (protruding member of nozzle side member)
3C rod-shaped portion
3D groove
4 plug side spring (elastic member of nozzle side member)
5 plug side shutoff valve (shutoff valve of nozzle side member)
6 plug side valve body (valve body of nozzle side member)
10 plug (nozzle side member)
11 rotational shape member
11A body portion
11B folded-back portion
20 socket (filling apparatus side member)
21 socket body
21A in-socket passage (passage of filling apparatus side member)
21C opening
21F annular space
21H large diameter portion
23 socket side spring (elastic member of filling apparatus side member)
24 socket side shutoff valve (shutoff valve of filling apparatus side member)
25 socket side valve body (valve body of filling apparatus side member)
26 supporting member (valve body supporting member)
27 plug member
27A opening of plug member
27B flange portion of plug member
28 plug member locking balls
29 stopper member
29A end surface of stopper member
30, 31 socket side passage cutoff mechanisms (filling apparatus side member passage cutoff mechanisms)
100, 100-1, 100-2 safety joints
S1, S2 sealing materials

The invention claimed is:

1. A safety joint including:
a nozzle side member with a flow path formed inside, a shutoff valve of the nozzle side member opening when the nozzle side member is connected to a filling apparatus side member; and
the filling apparatus side member having a cylindrical shape, a flow path in communication with the flow path of the nozzle side member being formed when the filling apparatus side member is connected to the nozzle side member;
and when the nozzle side member is disconnected from the filling apparatus side member, the flow paths of the nozzle side member and the filling apparatus side member are shut off, wherein
said filling apparatus side member has an opening that communicates with the flow path of the filling apparatus side member and extends orthogonally to the flow path of the filling apparatus side member;
when the nozzle side member and the filling apparatus side member are connected, a protruding portion of the nozzle side member is inserted into the opening on the filling apparatus side member; and
a filling apparatus side member flow path blocking mechanism is provided to instantly close the flow path of the filling apparatus side member at an initial stage when the nozzle side member is disconnected from the filling apparatus side member,
the filling apparatus side member flow path blocking mechanism including a support member for supporting a valve body of the filling apparatus side member, the support member being placed on a rotational shape member when the nozzle side member and the filling apparatus side member are connected, and moving to a state in which the support member does not support the valve body of the filling apparatus side member at the initial stage when the nozzle side member is disconnected from the filling apparatus side member;
the rotational shape member being provided with a folded-back portion, after the support member moves to a state in which the support member does not support the valve body of the filling apparatus side member at the initial stage when the nozzle side member is disconnected from the filling apparatus side member, the folded-back portion of the rotational shape member moving to a position surrounding the support member.

2. The safety joint as claimed in claim 1, wherein said filling apparatus side member flow path blocking mechanism further includes a valve body provided in the flow path of the filling apparatus side member, an elastic member on the filling apparatus side member urging the valve body of the filling apparatus side member flow path blocking mechanism.

3. The safety joint as claimed in claim 1, wherein said filling apparatus side member flow path blocking mechanism includes a plug member slidably inserted into the opening of the filling apparatus side member;
the plug member is connected to the protruding portion of the nozzle side member;

a sealing material is arranged at the opening of the filling apparatus side member to prevent a high-pressure gas from leaking from boundaries between an outer peripheral surfaces of the protruding portion of the nozzle side member as well as the plug member and an inner peripheral surface of the opening.

4. The safety joint as claimed in claim 3, further comprising a mechanism for disconnecting the plug member from the protruding portion of the nozzle side member when the nozzle side member is disconnected from the filling apparatus side member, wherein said mechanism includes:
   a groove formed in the protruding portion of the nozzle side member;
   an opening portion formed on the plug member;
   a ball fitted in the groove formed in the protruding portion and the opening portion formed on the plug member;
   an enlarged diameter portion at the opening portion of the filling apparatus side member;
   a flange portion at an end of the plug member; and
   an end face of a stopper member provided on the filling apparatus side member.

* * * * *